Nov. 9, 1943.   J. A. LA FRANCE ET AL   2,333,941
STRANDING OR ROPE LAYING MACHINE AND ITS CONTROL
Filed April 29, 1942   2 Sheets-Sheet 1

Fig.1.

INVENTOR:
JOSEPH A. LA FRANCE
and DANIEL D. SYMMES,
by John E. Jackson
their Attorney.

Nov. 9, 1943.                J. A. LA FRANCE ET AL                 2,333,941
                    STRANDING OR ROPE LAYING MACHINE AND ITS CONTROL
                            Filed April 29, 1942           2 Sheets-Sheet 2
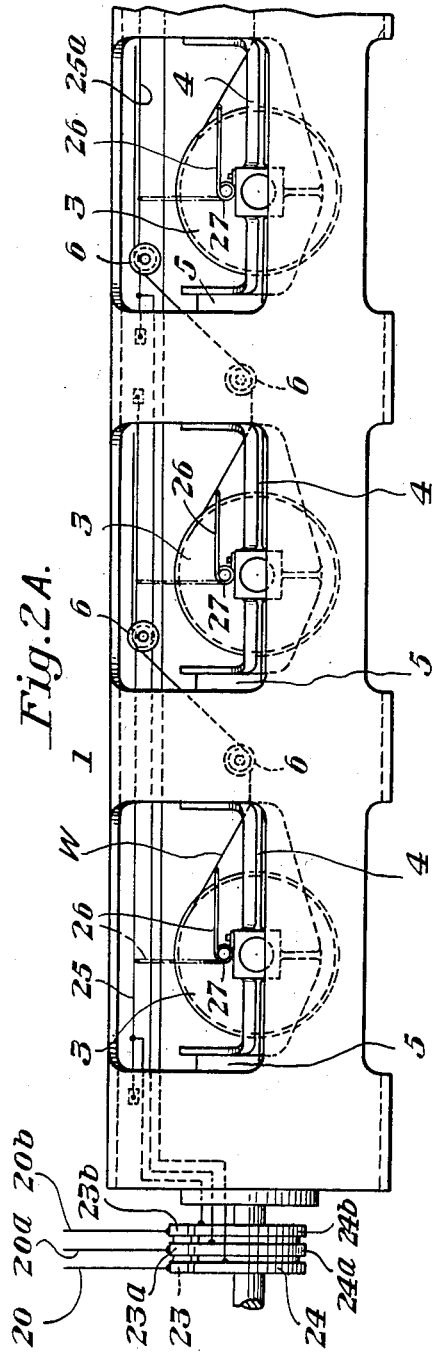
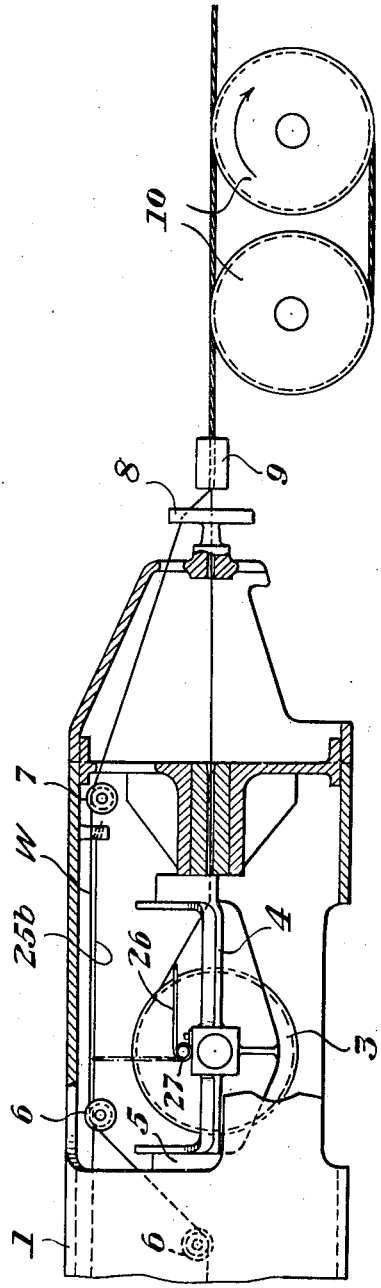
INVENTORS
JOSEPH A. LA FRANCE
and DANIEL D. SYMMES,
by: John E. Jackson
their Attorney.

Patented Nov. 9, 1943

2,333,941

UNITED STATES PATENT OFFICE 2,333,941

STRANDING OR ROPE LAYING MACHINE AND ITS CONTROL

Joseph A. La France and Daniel D. Symmes, West Haven, Conn., assignors to The American Steel and Wire Company of New Jersey, a corporation of New Jersey Application April 29, 1942, Serial No. 441,012

3 Claims. (Cl. 57—81)

This invention relates to stranding or rope laying machines, particularly when such a machine is provided with the control disclosed and claimed in Patent #2,208,306, the principles of the invention being applicable to any machine functioning in the manner of the machine specifically mentioned. The object leading to the invention covered by that patent was to automatically stop a machine of the type involved, upon the breaking or slackening of the material with which the machine is working, while in the present instance the object is to determine at least the approximate location of the spool feeding the material that has either broken or slackened so as to cause the machine to stop.

A specific example of a horizontal, tubular, wire stranding or rope laying machine embodying the principles of the invention is schematically illustrated in the accompanying drawings:

Fig. 1, showing the opposite ends of the machine and a wiring diagram, the portions of the machine between these ends not being shown to conserve space;

Fig. 2A showing the powered end of the machine, including a portion eliminated from Fig. 1 for space conservation purpose; and Fig. 2B showing the opposite end of the machine where the strand or rope is formed.

More specifically referring to these drawings, the machine includes a rotor 1 turned by an electric motor 2 and mounting a plurality of spools of wire 3 journaled in cradles 4 supported on trunnions 5, the spools 3 remaining in vertical planes while the rotor 1 rotates. The spools 3 carry wire W which feeds over sheaves 6 longitudinally of the machine to an annular series of final sheaves 7 circumferentially mounted inside the rotor 1 in spaced relationship.

Upon leaving the sheave 7 the wires from the various spools mutually approach a twister head 8 from which they go through a closing die 9 to a powered capstan 10. This capstan 10 pulls the wires, now in the form of a strand of intertwisted wires, from the die 9, this tensioning the wires back to each of the various spools 3 feeding each wire, which are braked in the usual manner. The motor 2 is electrically powered through lines 11 going to the usual drum controller, and the rotor 1 is provided with a brake 12 of the type held released against spring tension by a solenoid 13, this solenoid being energized by the lines 11. Therefore, when the motor 2 is deenergized, the solenoid 13 is also deenergized, this causing application of the brake 12 and consequent stopping of the rotor 1.

A magnetically tripped switch 14 is arranged with its contacts 15 in circuit with the line 11, this switch having a solenoid 16 for effecting tripping and consequent opening of its contacts 15. When this occurs, the circuit through the lines 11 is interrupted so that the motor 2 is deenergized, this also deenergizing the brake solenoid 13 so as to apply the brake 12 to stop the rotor 1.

Energization of the solenoid 16 of the switch 14, is effected by a circuit controlled by a low voltage relay 17 having contacts 18 through which the solenoid 16 of the switch 14 is energized by lines 11a branching from the lines 11. The relay 17 has a solenoid 19 for closing its contacts 18, and this solenoid is energized through lines 20 powered by the low-voltage side of a transformer 21 having its high-voltage side powered by the lines 11. One of the lines 20 is grounded to the rotor 1, as at 22, the other line connecting with a brush 23 working on a commutator 24 which turns with the rotor 1, this commutator connecting with an uninsulated wire 25 extending longitudinally inside the rotor 1, this wire being insulated from the rotor and connecting with the commutator so as to be engaged by a loop of spring wire 26 having its ends fixed to the journals of one of the spools 3 through coils 27, the arrangement being such that the loop normally tends to fly upwardly so as to engage the wire 25 as it is revolved by turning of the rotor 1. The loop 26 is restrained from this movement by reason of the wire W feeding over it under tension, but in case the wire breaks or becomes unduly slack, the loop springs outwardly so as to be contacted by the wire 25.

Each of the spools 3 is provided with one of these loops 26 in the manner disclosed and claimed in the identified patent, or with any equivalent means capable of functioning as a switch upon breaking or slackening of the wire feeding from the spool, so as to close the circuit through the lines 20. For reasons presently to be disclosed, the wire 25 does not extend the entire length of the rotor 1, but is divided into a plurality of respectively insulated sections, the other sections being indicated at 25a and 25b, the present arrangement differing from that of the patent in this respect.

As described in the patent, closing of the circuit through the lines 20 energizes the solenoid 19 of the relay 17 so as to close the contacts 18 of this relay and energize the solenoid 16 of the switch 14, the contacts 15 of this switch 14 then tripping open so as to break the circuit to the motor 2 and the brake solenoid 13, the rotor 1 then immediately stopping. Since the relay 17 and the circuit powered solenoid 19 are powered by the transformer 21 from the lines 11, the entire electric system also is deenergized.

As so far described, the arrangement is like that of the patent excepting that the wire 25 does not extend the length of the rotor in the form of a single length, it being insulatingly separated into the sections 25a and 25b, or any greater number of sections. This arrangements is provided so that each of the sections 25, 25a, 25b, etc. may be provided with its own relay 17, 17a, 17b, etc., and its own commutator 24, 24a, 24b, etc., contacted individually by brushes 23, 23a, 23b, etc., each separately energizing the solenoids 19, 19a, 19b, etc. of an equal number of relays, lines 20a, 20b, etc. completing the circuits for the various relays other than the relay 17.

With this new arrangement the rotor is stopped regardless of which spool is feeding the wire that breaks or slackens, but this stopping is effected by one or another of the relays 17 depending on the location of the spool, or groups of spools, feeding the particular wire causing the trouble. An electric annunciator 28 of the type providing separate electrically controlled indicators 29, 29a, 29b, etc. is arranged with each of its controlling solenoids in separate circuit through lines 30 and 31, 31a, 31b, etc., with the separate operating solenoids 19, 19a, 19b, etc., of the various relays 17, 17a, 17b, etc. so that one or another of the indicators 29, 29a, 29b, etc. works according to which of the solenoids 19, 19a, 19b, etc. is energized, this, in turn, depending on which one of the wires 25, 25a, 25b, etc. is contacted by the one of the spring loops 26 that operates due to breaking or slackening of the wire normally holding it at an inoperative position.

The arrangement is such that the plurality of electrically controlled indicators 29, 29a, 29b, etc. each represent one or a group of the spools 3, unrepresented by the other indicators, and so that the plurality of electric circuit makers and breakers provided by the loops 26 and the wires 25, or their equivalents, are each in controlling circuit with one of the controlling solenoids of one of the indicators 29, 29a, 29b, etc. not in circuit with others of these circuit makers and breakers, whereby location of the spool, or group of spools, feeding the wire that has broken or slackened, may be immediately detected.

The present invention is of great advantage because modern stranding and rope laying machines are now being made of great lengths, this causing confusion and delay as the operator searches the length of the rotor to determine the spool feeding the wire in trouble. The rotor may be made as a plurality of rotors arranged end to end, but since they turn together and all feed to the same die, they may be considered as a single rotor.

We claim:

1. A stranding or rope laying machine having a plurality of spools each feeding tensioned material, a plurality of electrically controlled indicators each representing at least one of the spools unrepresented by the other indicators, and a plurality of electric circuit makers and breakers each in controlling circuit with one of the indicators not in circuit with the other circuit makers and breakers and operated by slackening of the material fed from the spool represented by the indicator with which it is in controlling circuit.

2. A stranding or rope laying machine including the combination of a rotor, an electric motor for turning said rotor, a brake for stopping said rotor, a plurality of spools mounted by said rotor each feeding material under tension, a plurality of electrically controlled indicators each representing one of said spools unrepresented by others of said indicators, a plurality of electric switches each actuated by release of tension on said material fed from one of said spools which does not actuate others of said switches upon said release, a plurality of electromagnetic switches each having an operating solenoid and contacts, a plurality of circuits each powering one of said solenoids through one of said switches through which said solenoid is not powered by others of said circuits, a solenoid for operating said brake, a circuit controlling the powering of said motor and the last named solenoid through all of said contacts, and electric circuits each controlling one of said indicators through the contacts of one of said electromagnetic switches whose solenoid is powered by one of the first named circuits through the switch actuated by release of tension on the material fed from the spool represented by said one of said indicators.

3. A stranding or rope laying machine mounting a plurality of spools each feeding tensioned material, a plurality of indicators each representing at least one of the spools unrepresented by the other indicators, and means for operating each of the indicators in response to slackening of the material feed from the spool it represents.

JOSEPH A. LA FRANCE.
DANIEL D. SYMMES.